United States Patent
Cheaz

(10) Patent No.: US 7,530,072 B1
(45) Date of Patent: May 5, 2009

(54) METHOD TO SEGREGATE SUSPICIOUS THREADS IN A HOSTED ENVIRONMENT TO PREVENT CPU RESOURCE EXHAUSTION FROM HUNG THREADS

(75) Inventor: Nixon Cheaz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/116,670

(22) Filed: May 7, 2008

(51) Int. Cl.
  G06F 9/46 (2006.01)
  G06F 9/44 (2006.01)
  G06F 11/00 (2006.01)
  G06F 9/40 (2006.01)
  G06F 9/00 (2006.01)

(52) U.S. Cl. ............... 718/104; 718/100; 718/105; 718/103; 717/124; 717/127; 717/131; 714/25; 714/37; 714/47; 714/48; 714/38; 712/216; 712/219; 712/226

(58) Field of Classification Search ............. 718/1, 718/100, 101, 102, 103, 104, 105; 714/1, 714/100, 2, 25, 35, 37, 38, 39, 44, 45, 47, 714/48; 717/124, 128, 130, 131, 132, 141; 712/1, 216, 219, 226, 227, 245
See application file for complete search history.

(56) References Cited

U.S. PATENT DOCUMENTS

| | | | |
|---|---|---|---|
| 7,243,267 B2 | 7/2007 | Klemm et al. | |
| 7,269,758 B2 | 9/2007 | Kadashevich | |
| 2003/0126184 A1* | 7/2003 | Austin | 709/105 |
| 2005/0120273 A1* | 6/2005 | Hudson et al. | 714/38 |
| 2005/0235285 A1* | 10/2005 | Monasterio | 718/100 |
| 2007/0169066 A1* | 7/2007 | Nielsen | 717/162 |
| 2007/0220513 A1 | 9/2007 | Hwang | |
| 2007/0300230 A1 | 12/2007 | Barsness et al. | |

OTHER PUBLICATIONS

Kochuba, James, "Developing a Client to Determine a Hung Thread Problem", Dec. 15, 2004, pp. 1-6.

* cited by examiner

Primary Examiner—Lewis A. Bullock, Jr.
Assistant Examiner—Abdullah Al Kawsar
(74) Attorney, Agent, or Firm—Scully, Scott, Murphy & Presser, P.C.; Bruce Clay, Esq.

(57) ABSTRACT

A system and method for segregating suspicious threads in a hosted environment to prevent CPU resource exhaustion from hung threads are disclosed. An application server identify suspicious threads that may cause the threads to hang or to execute for a long period of time and transfers the suspicious threads to a thread quarantine manager, where the suspicious threads are bundled together with other threads that have been identified to be hung or to be executed for a long period of time.

2 Claims, 4 Drawing Sheets

METHOD TO SEGREGATE SUSPICIOUS THREADS IN A HOSTED ENVIRONMENT TO PREVENT CPU RESOURCE EXHAUSTION FROM HUNG THREADS

BACKGROUND OF THE INVENTION

1. Fields of the Invention

The present invention relates generally to an application server and more particularly to an application server that can prevent CPU resource exhaustion from hung threads.

2. Description of the Prior Art

A problem arises when faulty code executing in a computer device causes an infinite loop and take up CPU cycles without doing anything useful. Furthermore, subsequent calls to the threads executing the faulty code will result in numerous hung thread states or conditions. As a consequence, a hosted environment, (i.e., application server such as Websphere® Application Server) can be brought down to a halt due to CPU exhaustion.

Klemm et al (U.S. Pat. No. 7,243,267) discloses a JAS (Java Application Supervisor) that can provide automatic failure detection, automatic failure recording, and automatic failure recovery. The JAS receives process event notifications from a JRE (Java Runtime Environment) and determines whether an execution problem, or failure, has occurred. In response to such an event, the JAS executes specified actions that attempt to recover from detected failures and to restore the availability of the target application quickly and automatically.

An IBM technical article "Developing a client to determine a hung thread problem" written by James Kochuba on Dec. 15, 2004 address thread monitors in WAS (Websphere (Application Server) that report threads that may be hung. However, the thread monitors do not proactively perform steps to mitigate the effect of the hung threads in the overall application server. If the thread monitors' warnings go unnoticed, the hung threads will eventually overwhelm the system and take up all the CPU cycles available.

Therefore, it would be highly desirable to provide a system and method for guaranteeing that a hung thread condition will not take over a certain fraction of executing CPU cycles, leaving good threads to be responsive and minimally affected by other threads that invoke the faulty code.

SUMMARY OF THE INVENTION

The present invention is directed to a system and method for segregating suspicious threads running in a hosted computing environment to prevent CPU resource exhaustion from hung threads. The system and method utilizes a thread quarantine manager where suspicious threads (e.g., threads that execute program code that potentially causes the threads to hang or execute for a long period time) are bundled. In one embodiment, a thread quarantine manager may be an alternate thread manager, which is distinct from a regular thread scheduler typically present in the JRE. The alternate thread manager knows which threads are suspicious (i.e., execute code that cause the threads to hang or execute for a long period time) and limit the suspicious threads' CPU utilization to a fixed percentage of total available CPU (e.g., 25% of total available CPU resource). The thread quarantine manager manages the suspicious threads on its own and has discretion for selecting a suspicious thread to be executed and for defining an allowed execution time for the selected suspicious thread. Most of all, the thread quarantine manager does not allow suspicious threads in it to be executed more than an allotted maximum CPU time.

In one embodiment, the present invention includes a system for preventing CPU resource exhaustion in a hosted computing environment comprising:
  an application server for identifying, according to a defined criteria, suspicious threads that execute program code that potentially causes the suspicious threads to hang or enter an infinite loop, the criteria being based on one of: a comparison of stack traces of previously hung threads to stack traces of other threads in the system or a determination of long running threads from a stack trace; and
  a thread quarantine manager for managing the identified suspicious threads, the suspicious threads being registered in the quarantine manager by the application server, and for performing one or more of: throttling the suspicious threads to lower CPU usage, assigning the suspicious threads a maximum CPU usage limit as a group, and forcing the suspicious threads to execute at lower priorities,
  the application server processing the suspicious threads in the thread quarantine manager according to defined parameters, the one or more parameters comprising: an allowed maximum CPU usage limit for the suspicious threads in the thread quarantine manager and an exit criteria to allow a suspicious thread to exit the thread quarantine manager.

In another embodiment, the present invention provides a method for preventing CPU resource exhaustion in a hosted computing environment comprising:
  a. identifying, according to a defined criteria, suspicious threads that execute code that potentially causes the suspicious threads to hang or enter an infinite loop, the criteria being based on one of: comparing stack traces of previously hung threads to stack traces of other threads in the system or determining long running threads from a stack trace;
  b. registering the suspicious threads in a thread quarantine manager;
  c. throttling, by the thread quarantine manager, the suspicious threads to a lower CPU usage;
  d. assigning a maximum CPU usage limit as a group of suspicious threads, and forcing the suspicious threads to execute at lower priorities; and
  e. processing, at the application server, the suspicious threads in the thread quarantine manager according to one or more defined parameters, the one or more parameters comprising: an allowed maximum CPU usage limit for the group and an exit criteria to allow a suspicious thread to exit the thread quarantine manager.

The present invention is beneficial in at least two ways:

The suspicious threads that execute faulty code will quickly be identified as showing performance degradation.

The threads that don't call the faulty code are minimally affected, so they can continue to function normally. If the faulty code is invoked from a seldom used and non-critical feature in the application, users can still perform functions without any system downtime.

BRIEF DESCRIPTION OF THE DRAWINGS

The accompanying drawings are included to provide a farther understanding of the present invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
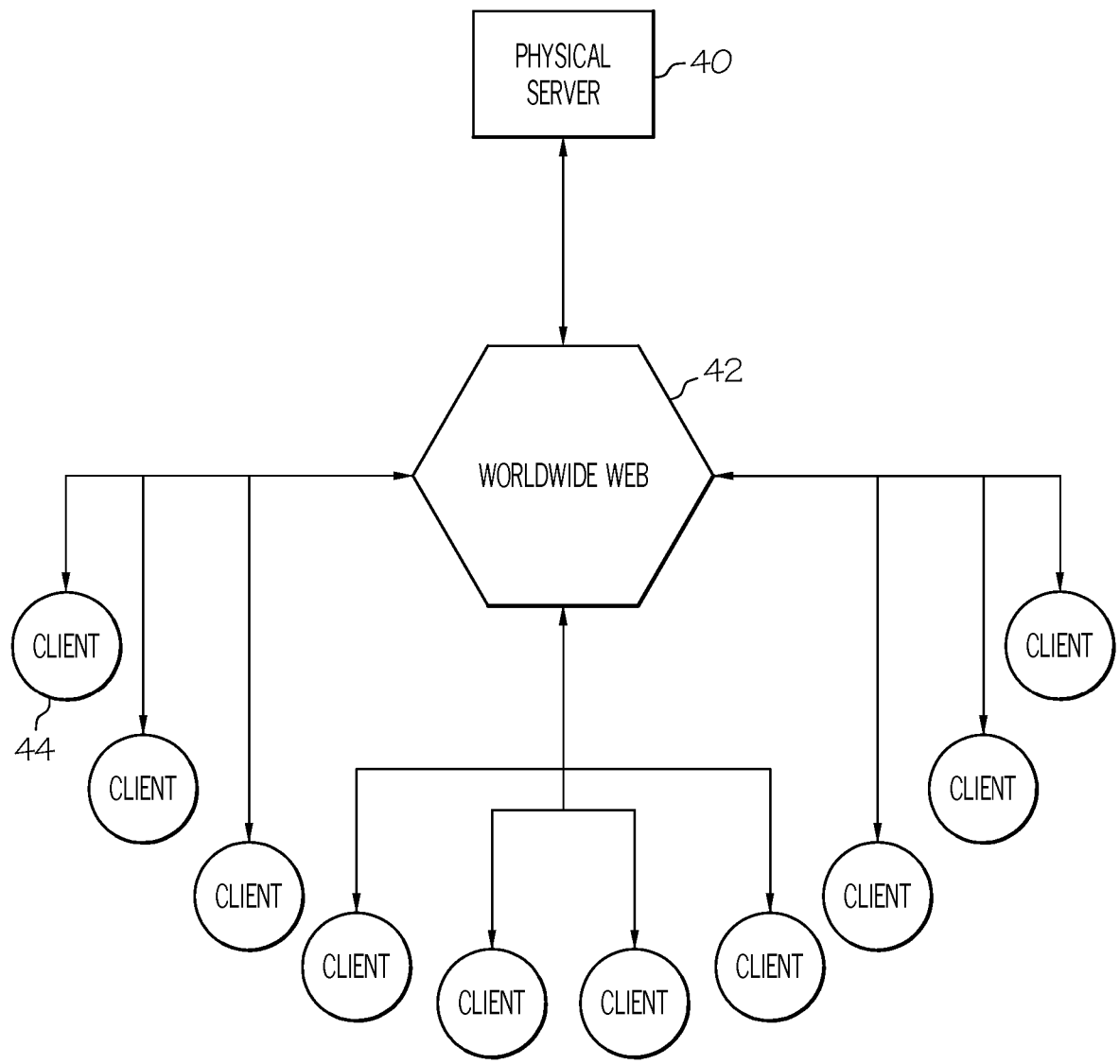
FIG. 1 illustrates how an application server is accessed externally over the web by multiple clients.

Reference is now had to FIG. 1. A physical server 40, which is a hardware machine that software is running on, is connected to a number of client devices such as a client device 44 through a network such as TCP/IP, wireless LAN, LAN, and Internet. FIG. 1 illustrates the physical server 40 is connected to client devices such as 44 via Internet (World Wide Web) 42. In web applications, each request is handled by a thread executing under control of an executing processor (CPU). Each user makes multiple requests while using the web applications, and in general, a web application serves a large number of clients. In one embodiment, the physical server may comprise IBM X Websphere® Application Server (WAS). Any physical server, which comprises an application server, can benefit from the present invention.

Figure 2:
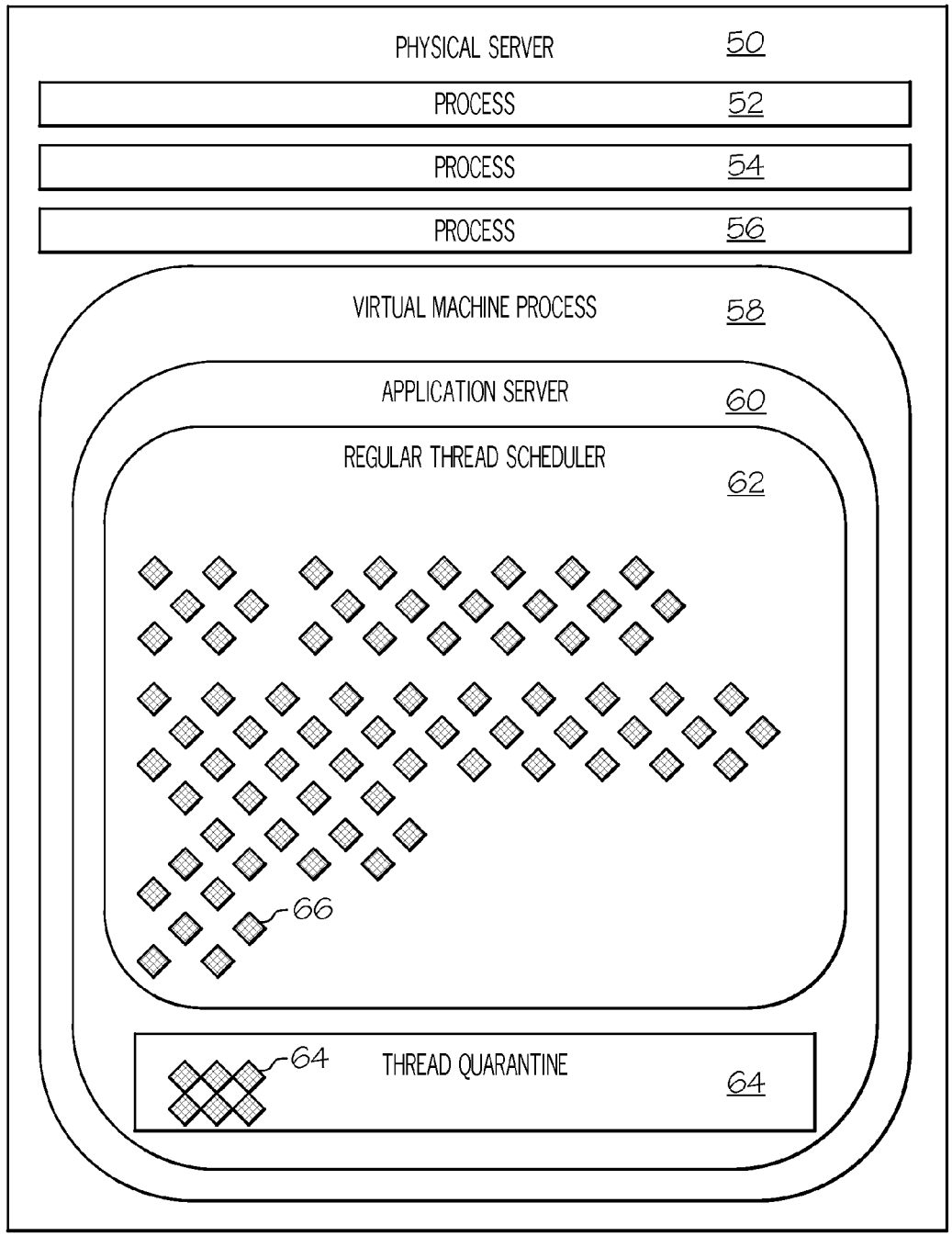
FIG. 2 depicts a view of a physical server and an application server process.

FIG. 2 represents a view of a physical server and an application server process. A number of executing processes 52, 54, 56, and 58 run in a physical server 50. A process may be a virtual machine process 58, which comprises a number of threads. The virtual machine may be Java Virtual Machine (JVM)®, .net® CLR (Common Language Runtime), or any other Virtual Machine. In Microsoft® Windows®, the virtual machine process would show up in the task manager as a process called "javaw.exe". Such "hosted" threads (i.e., threads running in a process) are represented as diamonds in the FIG. 2, and majority of the threads such as a thread 66 are handled by the regular thread scheduler 62 (e.g., in JVM (Java Virtual Machine), a thread scheduler is a process via which the JVM manages its threads. The JVM schedules threads using a preemptive, priority-based algorithm. All Java threads have a priority and the thread with the highest priority is scheduled to run by the JVM.).

An application server 60 is equipped with functions to identify suspicious threads (e.g., by comparing stack traces of previously hung threads to stack traces of other threads or by looking at stack traces of long ruining threads). FIG. 2 shows a thread 68 that is identified as a suspicious thread that executes code that cause the (suspicious) thread to either hang or execute for a long period of time. The application server registers the suspicious thread in a thread quarantine manager 64 with other identified suspicious threads.

In one embodiment, the application server 60 may be software such as Websphere® Application Server. In the Websphere® Application Server, the application server is running on one Virtual Machine Process. Initially, the thread quarantine manager 64 is devoid of threads. After suspicious threads are identified by the application server 60, the thread quarantine manager 64 starts to have threads such as thread 68. The threads assigned to a thread quarantine manager 64 are still be executed, but are throttled to lower CPU usage being apportioned with reduced CPU running time. In one embodiment, the threads are assigned a maximum CPU usage limit as a group (e.g., 25% of total available CPU resource) and are forced to execute at lower priority levels. In another embodiment, the maximum CPU usage limit may be set by a user (e.g., an application server administrator). Hence, the entire collection of suspicious threads in the thread quarantine manager 64 have an assigned maximum limit as to how much CPU they can consume. For example, if 25% of total CPU resource is assigned to suspicious threads in the thread quarantine manager 64, the thread quarantine manager 64 allows the suspicious threads to run and monitors the suspicious threads to make sure that 25% maximum limit is not exceed. Therefore, the suspicious threads that call the faulty code that causes the suspicious threads to hang will become increasingly less responsive, but other non-suspicious threads are going to be minimally affected by that faulty code. In one embodiment, the application server 60 splits processing of threads by a ratio of 5:1 between the regular thread scheduler 62 and the thread quarantine manager 64. In another embodiment, the application server 60 may apportion processing of threads between the regular thread scheduler 62 and the thread quarantine manager 64 according to 4:1, 6:1, or other ratios. Deciding a splitting ratio between the regular thread scheduler 62 and the thread quarantine manager 64 is an implementation choice and can be set by a user or via automatically configured. In one embodiment, the thread quarantine manager 64 can have at most 20% CPU resource to process the suspicious threads in the thread quarantine manager 62. In another embodiment, the quarantine manager 64 can have at most 25% or 30% CPU resource to process the suspicious threads in the thread quarantine manager 64. Selecting an allowed maximum CPU usage limit for the suspicious threads in the thread quarantine manager 64 is an implementation choice and can be programmed by a user.

Figure 3:
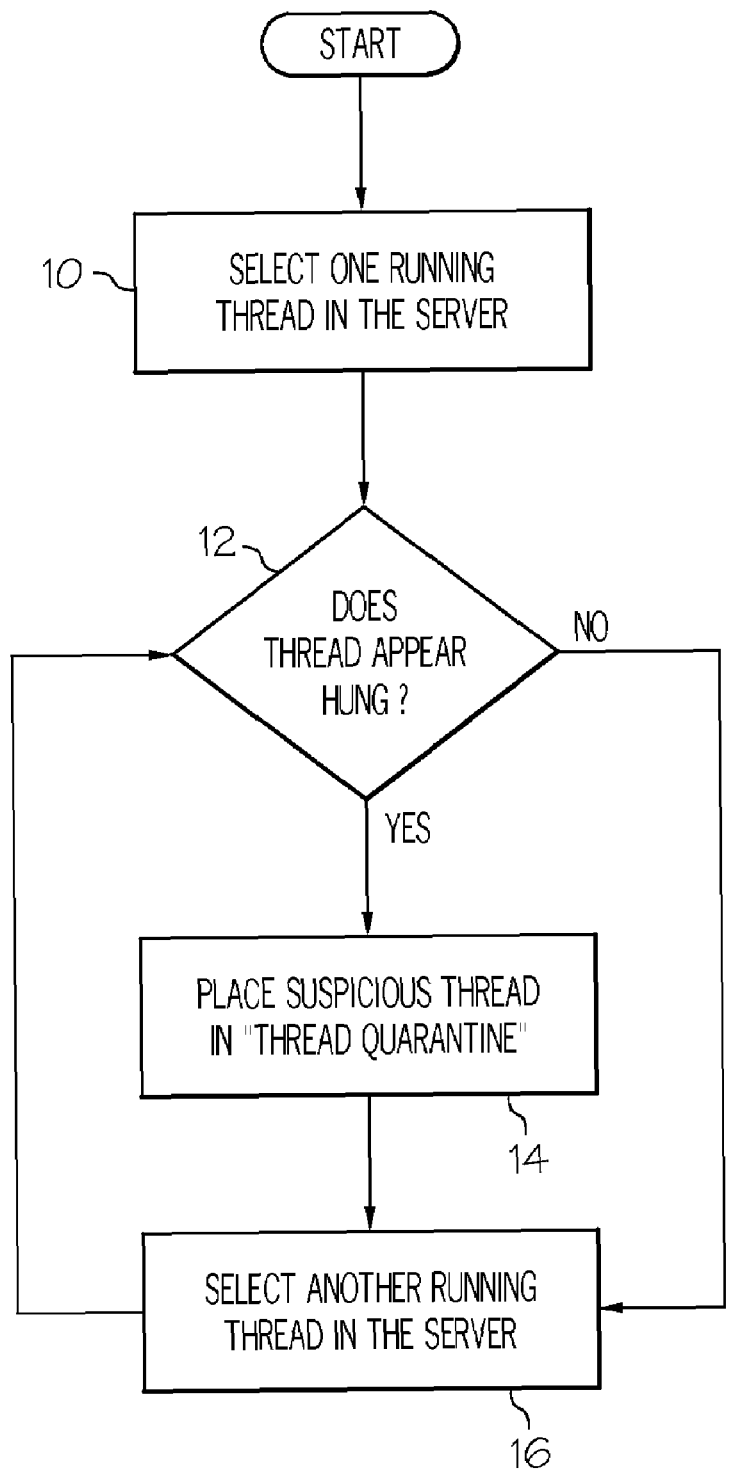
FIG. 3 depicts a flow chart that an application server employs.

Reference is now had to FIG. 3, which illustrates a process where the application server 60 identifies and sends suspicious threads to the thread quarantine manager 64. At step 10, the application server selects a running thread. At step 12, the application server checks if the running thread is hung, e.g., stuck in an infinite loop due to design flaws or programming bugs. At step 14, if the running thread is hung, the running thread is placed in the thread quarantine manager 64, which functions like an alternate thread manager for the suspicious threads. The alternate thread manager knows which threads are suspicious (i.e., execute code that cause the threads to hang or execute for a long period time) and limit the suspicious threads' CPU utilization to a fixed percentage of total available CPU (e.g., 25% of total available CPU resource). The thread quarantine manager 64 manages the suspicious threads and has discretion for selecting a suspicious thread to be executed and for defining an allowed execution time for the selected suspicious thread. Most of all, the thread quarantine manager 64 do not allow suspicious threads in it to be executed more than an allotted maximum CPU time. At step 16, if the running thread does not appear to be hung or if the running thread is placed in the thread quarantine manager 64, the application server 60 selects another running thread to check whether that running thread appears to be hung or not. In one embodiment, the application server 60 defines criteria for determining suspicious threads and registering the suspicious threads in the thread quarantine manager 64. In one example embodiment, the application server 60 measure all threads' duration, e.g., measures or monitors all threads' running time, and identifies a thread as a suspicious thread if the thread has been running longer than a pre-determined running time threshold (e.g., a thread has been running for more than 3000 milliseconds.). In another example embodiment, the criteria can be based on a comparison of stack traces of previously hung threads to stack traces of other threads in the system, or a determination of long running threads form a stack trace. In another embodiment, the criteria to determine a suspicious thread is defined and set by a user such as an application server administrator. Once a thread is determined as suspicious, the thread is registered for execution under the control of the thread quarantine manager 64, and the thread's executing privilege is restricted. In one embodiment, the application server 60 defines parameters for the suspicious threads in the thread quarantine manager 64. The parameters may be combined CPU usage of the suspicious threads in the thread quarantine manager 64 and an exit criteria to allow a suspicious thread to exit the thread quarantine manager 64. In one embodiment, as a suspicious thread runs in a thread quarantine manager 64, its execution is analyzed. After analyzing execution trace (e.g., analyzing a stack trace) of a suspicious thread in thread quarantine manager 64, if the suspicious thread is determined not hung (i.e., does not execute a code that cause a hang or an infinite loop), the suspicious thread and similar suspicious threads (e.g., threads having same stack trace) are allowed to exit the thread quarantine manager 64, to restore their original priorities, and to resume unrestricted execution. The combined CPU usage parameter can be user-defined and normally set to a low enough level that even if the faulty code is invoked repeatedly by some threads, the threads does not affect overall system performance. The application server 60 can also provide facilities to allow application server administrators' run-time control over related parameters, so the application server administrators can free threads from the thread quarantine manager 64 and also tweak criteria for the suspicious threads.

Figure 4:
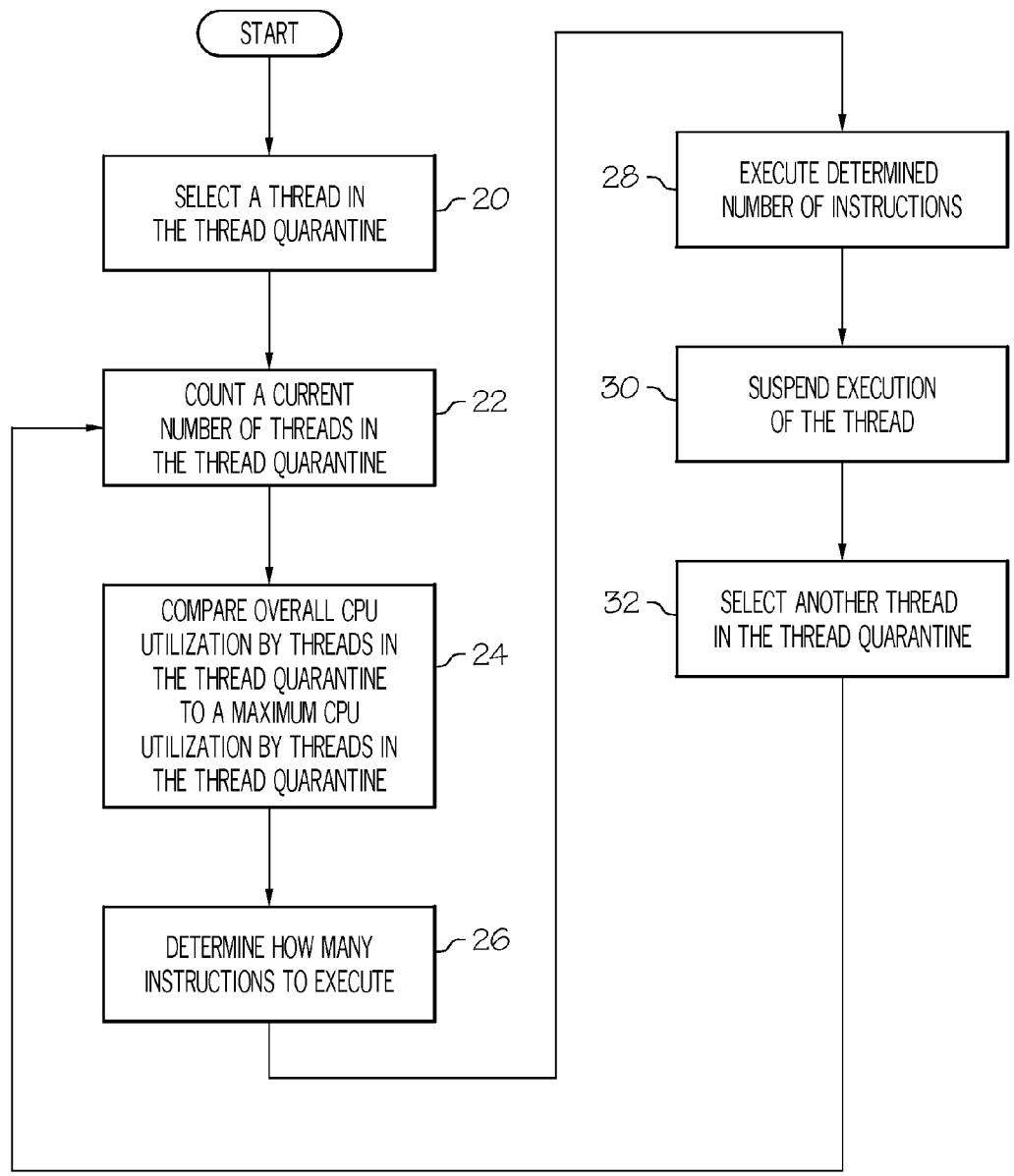
FIG. 4 depicts an execution process of suspicious threads in a thread quarantine manager.

In an alternative embodiment, suspicious threads entering the thread quarantine manager 64 are immediately halted and their execution stopped. The suspicious threads in the thread quarantine manager 64, however, will not be completely killed, but will be allowed to resume execution in a controlled manner. Reference is now had to FIG. 4, which illustrates a process via which suspicious threads in the thread quarantine manager 64 are allowed to resume execution in a controlled manner to protect the application resources from being hogged. At step 20, the application server 60 selects a suspicious thread in the thread quarantine manager 64. At step 22, the application server determines a current number of suspicious threads in the thread quarantine manager 64. At step 24, the application server 60 compares overall CPU utilization of the suspicious threads in the thread quarantine manager 64 to a maximum allowed CPU utilization of the suspicious threads in the thread quarantine manager 64. At step 26, the application server 60 determines how many instructions in the selected suspicious thread are to be executed. At step 28, the application server executes the determined number of instructions in the selected suspicious thread. At step 30, after executing the determined number of instructions in the selected suspicious thread, the application server suspends execution of the selected suspicious thread. At step 32, the application server selects another suspicious thread in the thread quarantine manager 64 to execute that suspicious thread in a like limited manner.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A system having a processor (CPU) for preventing CPU resource exhaustion in a hosted computing environment comprising:

an application server for identifying, according to a defined criteria, suspicious threads that execute program code that potentially causes said suspicious threads to hang or enter an infinite loop, said criteria being based on one of: a comparison of stack traces of previously hung threads to stack traces of other threads in said system or a determination of long running threads from a stack trace; and a thread quarantine manager for managing said identified suspicious threads, said suspicious threads being registered in said quarantine manager by said application server, and for performing: throttling said suspicious threads to lower CPU usage, assigning said suspicious threads a maximum CPU usage limit as a group, and forcing said suspicious threads to execute at lower priorities, said application server processing said suspicious threads in said thread quarantine manager according to defined parameters, said parameters comprising: an allowed maximum CPU usage limit for said suspicious threads in said thread quarantine manager and an exit criteria to allow a suspicious thread to exit said thread quarantine manager, said exit criteria determining whether said suspicious thread is hung, if said suspicious thread is not hung, said application server restoring an original priority of said suspicious thread and resuming an execution of the suspicious thread without a restriction, and otherwise, said suspicious thread resuming an execution in said thread quarantine manager in a controlled manner, wherein said application server and said thread quarantine manager are executed by said processor.

2. A computer-implemented method for preventing CPU resource exhaustion in a hosted computing environment comprising:

a. identifying, according to a defined criteria, suspicious threads that execute code that potentially causes said suspicious threads to hang or enter an infinite loop, said criteria being based on one of: comparing stack traces of previously hung threads to stack traces of other threads in said system or determining long running threads from a stack trace;

b. registering said suspicious threads in a thread quarantine manager;

c. throttling, by said thread quarantine manager, said suspicious threads to a lower CPU usage;

d. assigning a maximum CPU usage limit as a group of suspicious threads, and forcing said suspicious threads to execute at lower priorities; and e. processing, at said application server, said suspicious threads in the thread quarantine manager according to defined parameters, said parameters comprising: an allowed maximum CPU usage limit for said group and an exit criteria to allow a suspicious thread to exit said thread quarantine manager, said exit criteria determining whether said suspicious thread is hung, if said suspicious thread is not hung, said application server restoring an original priority of said suspicious thread and resuming an execution of the suspicious thread without a restriction, and otherwise, said suspicious thread resuming an execution in said thread quarantine manager in a controlled manner.

\* \* \* \* \*